United States Patent
Jin et al.

(10) Patent No.: US 9,390,513 B2
(45) Date of Patent: Jul. 12, 2016

(54) SIMULTANEOUS METADATA EXTRACTION OF MOVING OBJECTS

(71) Applicant: HUA ZHONG UNIVERSITY OF SCIENCE TECHNOLOGY, Wuhan, Hubei (CN)

(72) Inventors: Hai Jin, Hubei (CN); Long Chen, Hubei (CN); Ran Zheng, Hubei (CN); Qin Zhang, Hubei (CN); Lei Zhu, Hubei (CN)

(73) Assignee: HUA ZHONG UNIVERSITY OF SCIENCE TECHNOLOGY, Wuhan, Hubei (CN)

( * ) Notice: Subject to any disclaimer, the term of this patent is extended or adjusted under 35 U.S.C. 154(b) by 0 days.

(21) Appl. No.: 14/422,932

(22) PCT Filed: Oct. 29, 2013

(86) PCT No.: PCT/CN2013/086140
§ 371 (c)(1),
(2) Date: Feb. 20, 2015

(87) PCT Pub. No.: WO2015/061964
PCT Pub. Date: May 7, 2015

(65) Prior Publication Data
US 2016/0036882 A1    Feb. 4, 2016

(51) Int. Cl.
*G06T 7/20* (2006.01)
*G06F 9/48* (2006.01)
(Continued)

(52) U.S. Cl.
CPC ............ *G06T 7/2006* (2013.01); *G06F 9/4843* (2013.01); *G06F 9/50* (2013.01);
(Continued)

(58) Field of Classification Search
CPC ................ G06F 17/30283; G06F 17/30784; G06F 17/3079; G06F 17/30799; G06F 9/4843; G06F 9/50; G06F 9/5027; G06F 9/5044; G06F 9/5055; H04L 67/10; H04L 67/1002; H04L 67/1076; H04L 67/1078; H04L 67/108; G06K 9/46; G06K 9/4604; G06K 9/007711; G06T 7/0097; G06T 7/0071; G06T 7/0085; G06T 7/20; G06T 7/2006; H04N 19/176
See application file for complete search history.

(56) References Cited

U.S. PATENT DOCUMENTS

| | | | | |
|---|---|---|---|---|
| 7,162,691 B1 * | 1/2007 | Chatterjee | ......... | G06F 17/30896 707/E17.108 |
| 8,121,197 B2 * | 2/2012 | Rosenzweig | ........ | H04N 19/174 375/240.25 |

(Continued)

FOREIGN PATENT DOCUMENTS

| CN | 101299812 A | 11/2008 |
|---|---|---|
| CN | 101601286 A | 12/2009 |
| CN | 101686388 A | 3/2010 |

OTHER PUBLICATIONS

Cinalli, D., et al., "MetaData Embedding in Compressed UAV Video," American Society of Naval Engineers, Intelligent Ship Symposium V, Philadelphia, pp. 1-5 (May 12-13, 2003).

(Continued)

*Primary Examiner* — Ramy M Osman
(74) *Attorney, Agent, or Firm* — Brundidge & Stanger, P.C.

(57) ABSTRACT

In some examples, a main computing device may be configured to segment the video stream into multiple video clips processing a video stream that includes multiple frames. Further, the main computing device may be configured to distribute the video clips to multiple computing nodes to extract the metadata of moving objects in the video clips. The extracted metadata of a same moving object that appears in different video clips may be further merged together by the main computing device.

18 Claims, 5 Drawing Sheets

(51) Int. Cl.
*G06F 9/50* (2006.01)
*G06K 9/46* (2006.01)
*G06T 7/00* (2006.01)
*H04N 19/176* (2014.01)
*G06F 17/30* (2006.01)
*H04L 29/06* (2006.01)

(52) U.S. Cl.
CPC ....... *G06F 9/5044* (2013.01); *G06F 17/30997* (2013.01); *G06K 9/46* (2013.01); *G06T 7/0071* (2013.01); *H04L 65/602* (2013.01); *H04N 19/176* (2014.11)

(56) References Cited

U.S. PATENT DOCUMENTS

| | | | |
|---|---|---|---|
| 8,218,642 B2 | 7/2012 | Gao et al. | |
| 8,301,669 B2 | 10/2012 | O'Brien-Strain et al. | |
| 8,755,438 B2* | 6/2014 | Layachi | H04N 19/176 375/240.15 |
| 2005/0234985 A1 | 10/2005 | Gordon et al. | |
| 2005/0251580 A1* | 11/2005 | Tu | H04L 67/108 709/236 |
| 2005/0276446 A1* | 12/2005 | Chen | G06T 7/2006 382/103 |
| 2006/0083305 A1* | 4/2006 | Dougherty | H04N 19/176 375/240.12 |
| 2006/0227995 A1* | 10/2006 | Spatharis | G06F 17/30265 382/100 |
| 2006/0245618 A1* | 11/2006 | Boregowda | G06T 7/2006 382/107 |
| 2007/0292106 A1* | 12/2007 | Finkelstein | G11B 27/28 386/241 |
| 2008/0059467 A1* | 3/2008 | Bivolarski | G06F 9/3842 |
| 2008/0126278 A1* | 5/2008 | Bronstein | G06T 7/2006 706/17 |
| 2008/0276261 A1* | 11/2008 | Munshi | G06F 9/4843 719/328 |
| 2009/0059944 A1* | 3/2009 | Omino | H04L 43/0817 370/419 |
| 2009/0074080 A1* | 3/2009 | He | H04N 19/176 375/240.26 |
| 2009/0132462 A1* | 5/2009 | Szabo | G06F 17/30038 |
| 2011/0158319 A1* | 6/2011 | Bae | H04N 19/176 375/240.16 |
| 2011/0243385 A1* | 10/2011 | Nishino | G06T 7/2013 382/103 |
| 2013/0139165 A1* | 5/2013 | Doukhvalov | G06F 21/567 718/102 |
| 2015/0325000 A1* | 11/2015 | Sripada | G06T 7/20 382/103 |

OTHER PUBLICATIONS

International search report and written opinion for PCT application No. PCT/CN2013/086140 mailed on Jul. 30, 2014.

Nugraha, I.G.B.B., et al., "Multiple object tracking on static surveillance video using field-based prediction information in MPEG-2 video," 17th IEEE International Conference on Image Processing (ICIP), pp. 4625-4628 (Sep. 26-29, 2010).

Pan, P., and Schonfeld, D., "Video Tracking Based on Sequential Particle Filtering on Graphs," IEEE Transactions on Image Processing, vol. 20, No. 6, pp. 1641-1651 (Jun. 2011).

Suri, S., and Vassilvitskii, S., "Counting Triangles and the Curse of the Last Reducer," published in Proceeding WWW 2011proceeding of the 20th international conference on World wide web, pp. 607-614 (Mar./Apr. 2011).

Zhu, J., et al., "Object Tracking in Structured Environments for Video Surveillance Applications," IEEE Transactions on Circuits and Systems for Video Technology, vol. 20, No. 2, pp. 223-235 (Feb. 2010).

* cited by examiner

SIMULTANEOUS METADATA EXTRACTION OF MOVING OBJECTS

CROSS-REFERENCE TO RELATED APPLICATIONS

This Application is the National Stage filing under 35 U.S.C. §371 of PCT Application Ser. No. PCT/CN2013/086140 filed on Oct. 29, 2013. The disclosure of the PCT Application is hereby incorporated herein by reference in its entirety.

TECHNICAL FIELD

The technologies described herein pertain generally to simultaneous metadata extraction of moving objects in a video stream.

BACKGROUND

Unless otherwise indicated herein, the approaches described in this section are not prior art to the claims in this application and are not admitted to be prior art by inclusion in this section.

In processing a video stream that includes multiple frames, serial processing, relative to parallel processing, may cause low efficiency since the multiple frames are processed in chronological order. That is, processing of later frames may be delayed until the former frames are processed. Current parallel processing methodologies may encounter similar problems since the extraction of metadata of moving objects in later frames may depend on the metadata of the moving objects in former frames.

SUMMARY

Technologies are generally described for simultaneous extraction of metadata of moving objects in a video stream. The various techniques described herein may be implemented in various methods, systems, and/or computer-readable mediums.

In some examples, various embodiments may be implemented as methods. Some methods may include segmenting a video stream that includes multiple frames into multiple video clips; calculating a computational complexity value for each of the multiple video clips; and distributing the multiple video clips to multiple computing nodes, each of which is configured to identify one or more moving objects in each of the multiple video clips, and extract metadata corresponding to each of the one or more moving objects from each of the multiple video clips.

In some examples, various embodiments may be implemented as systems. Some systems may include a first computing device configured to: receive a video stream that includes multiple frames; detect object information in at least one of the multiple frames; select a plurality of frames from the multiple frames as candidate segment points, at which the object information changes more than a first predetermined amount relative to a frame that immediately follows, respectively, each of the plurality of frames; determine one or more frames from the plurality of frames as segment points; and segment the video stream into multiple video clips, each of which includes a subset of the multiple frames, based on the segment points that identify the beginning of each of the multiple video clips. Such systems may further include multiple computing nodes each configured to receive one of the multiple video clips from the first computing device, identify one or more moving objects appear in respective one of the multiple video clips, and extract metadata corresponding to each of the one or more moving objects from each of the multiple video clips.

In some examples, various embodiments may be implemented as computer-readable mediums having executable instructions stored thereon. Some computer-readable mediums may store instructions that, when executed, cause one or more processors to perform operations comprising receiving a video stream that includes multiple frames; detecting object information in at least one of the multiple frames; selecting a plurality of frames from the multiple frames as candidate segment points, at which the object information changes more than a first predetermined amount relative to a frame that immediately, respectively, follows each of the plurality of frames; determining one or more frames from the plurality of frames as segment points; and segmenting the video stream into multiple video clips, each of which includes a subset of the multiple frames, based on the segment points that identify the beginning of each of the multiple video clips.

In yet other examples, various embodiments may be implemented as computer-readable mediums having executable instructions stored thereon. Some computer-readable mediums may store instructions that, when executed, cause one or more processors to perform operations comprising receiving one of multiple video clips from a first computing device, identifying one or more moving objects appear in respective one of the multiple video clips, and extracting metadata corresponding to each of the one or more moving objects from each of the multiple video clips.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
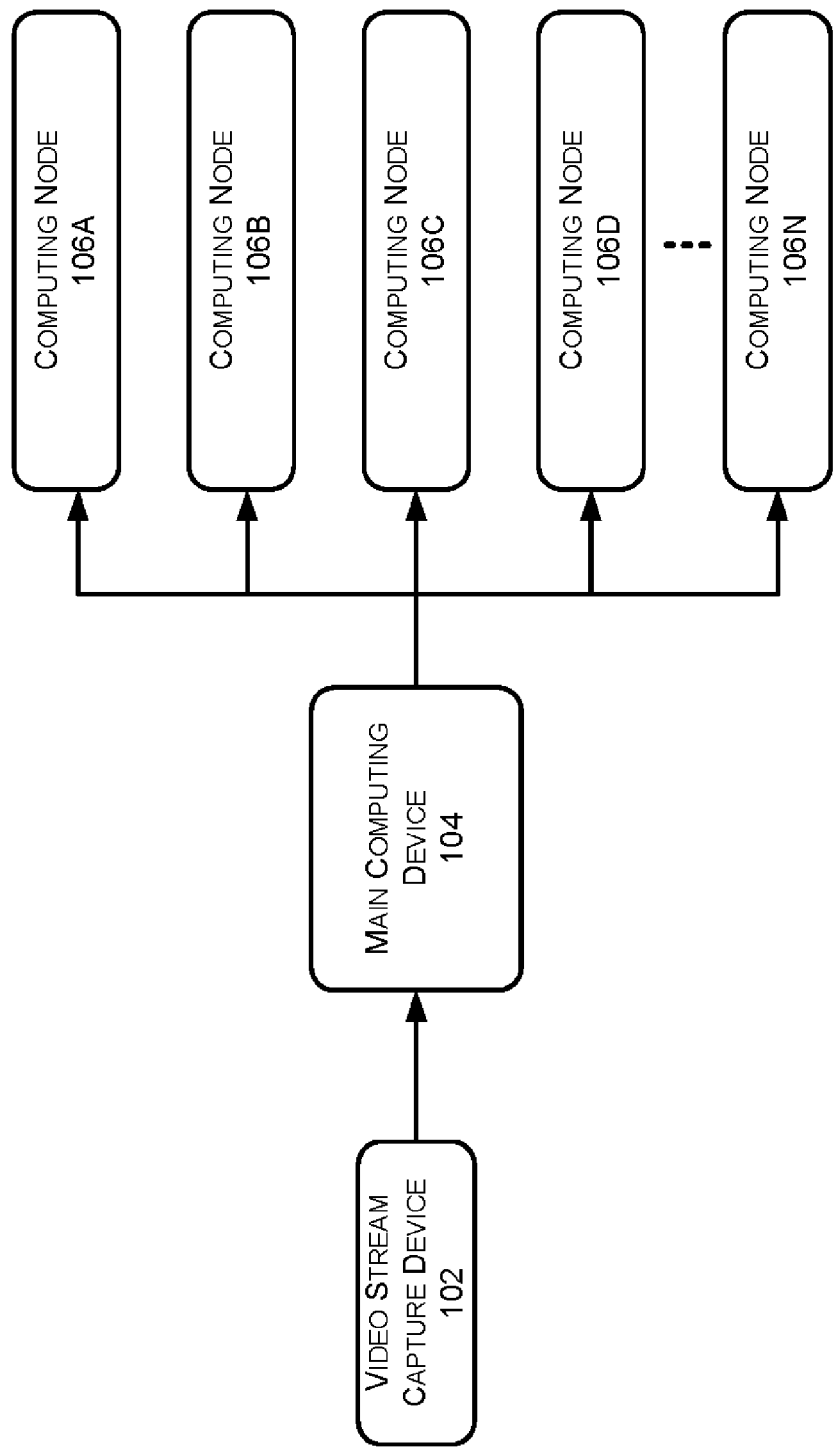
FIG. 1 shows an example system by which simultaneous metadata extraction of moving objects in a video stream may be implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 100 by which simultaneous metadata extraction of moving objects in a video stream may be implemented, arranged in accordance with at least some embodiments described herein. As depicted, example system 100 may include, at least, a video stream capture device 102, a main computing device 104, and multiple computing nodes 106A, 106B, 106C, 106D, and 106N. Unless context requires specific reference to one or more of computing nodes 106A-106N, collective reference may be made to "computing nodes 106;" general reference to one of computing nodes 106A-106N may be made to "computing node 106."

Video stream capture device 102 may refer to a physical device capable of periodically capturing multiple still images, i.e., frames, which create a video stream when presented continuously and sequentially to a viewer. In some examples, video stream capture device 102 may refer to a security camera, a surveillance camera, or a video camera in a closed-circuit television (CCTV) system. The captured video stream may include more than one moving object (e.g., vehicles, pedestrians, or animals) and the information thereof (e.g., the trajectory, the shape, the color, the texture of the moving objects). Such information may be referred to as "object information" hereafter. Video stream capture device 102 may be configured to feed the video stream to main computing device 104.

Main computing device 104 may refer to a computing device that may be communicatively coupled to video stream capture device 102 via, for example, a wired or wireless network. Main computing device 104 may include one or more hardware components (not shown), e.g., memories, central processing units (CPUs), network adapters, hard drives, etc., to perform computing tasks to process the video stream received from video stream capture device 102.

In an example embodiment, main computing device 104 may be configured to detect the object information of the moving objects in the video stream and then segment the video stream into multiple video clips. The method for segmenting the video stream so that the computational complexity of each video clip may be substantially similar to each other is described in greater detail in accordance with FIG. 2. Main computing device 104 may be configured to further analyze the video stream and to gather one or more parameters regarding the video stream, which may include the number of the multiple frames of the video stream, the percentage of the object information in the video stream, and the resolution of the video stream. Such analyzing may include deinterlacing, digital zooming, edge enhancing, motion compensation, detail enhancing, etc. Main computing device 104 may be further configured to distribute each of the multiple video clips to one of computing nodes 106.

Computing nodes 106 may refer to one or more computing devices that may be communicatively coupled to main computing device 104 via, for example, a wired or wireless network. Similar to main computing device 104, each of computing nodes 106 may include multiple hardware components, e.g., memories, CPUs, network adapters, hard drives, etc. A computational capability value may be generated for each computing node 106 based on the parameters of the hardware components, e.g., the speed of the CPUs, to indicate the capability to perform computing tasks. For example, the computational capability value may be represented in a form of a vector that includes multiple elements, each of which represents one of the parameters, e.g., a vector [3.5, 4, 12] may represent the computational capability value of a computing node that has a four-core CPU running 3.5 GHz and a 12 GB memory.

In some example embodiments, each of computing nodes 106 may be configured to receive a video clip from main computing device 104, via the network, identify one or more moving objects in the video clip, and extract the metadata corresponding to each moving object. As referenced herein, metadata may refer to data that includes a trajectory, color(s), texture(s), and/or shape(s) of the moving objects in the video stream. The extracted data may be transmitted back to main computing device 104 so that main computing device 104 may be configured to merge the metadata of the same moving object that is common to multiple video clips.

Thus, FIG. 1 show an example system 100 that include video stream capture device 102 that may be configured to capture and feed a video stream to main computing device 104, main computing device 104 that may be configured to segment the video stream into multiple video clips, and computing nodes 106 that may be configured to extract the metadata of one or more moving objects from each video clip.

Figure 2:
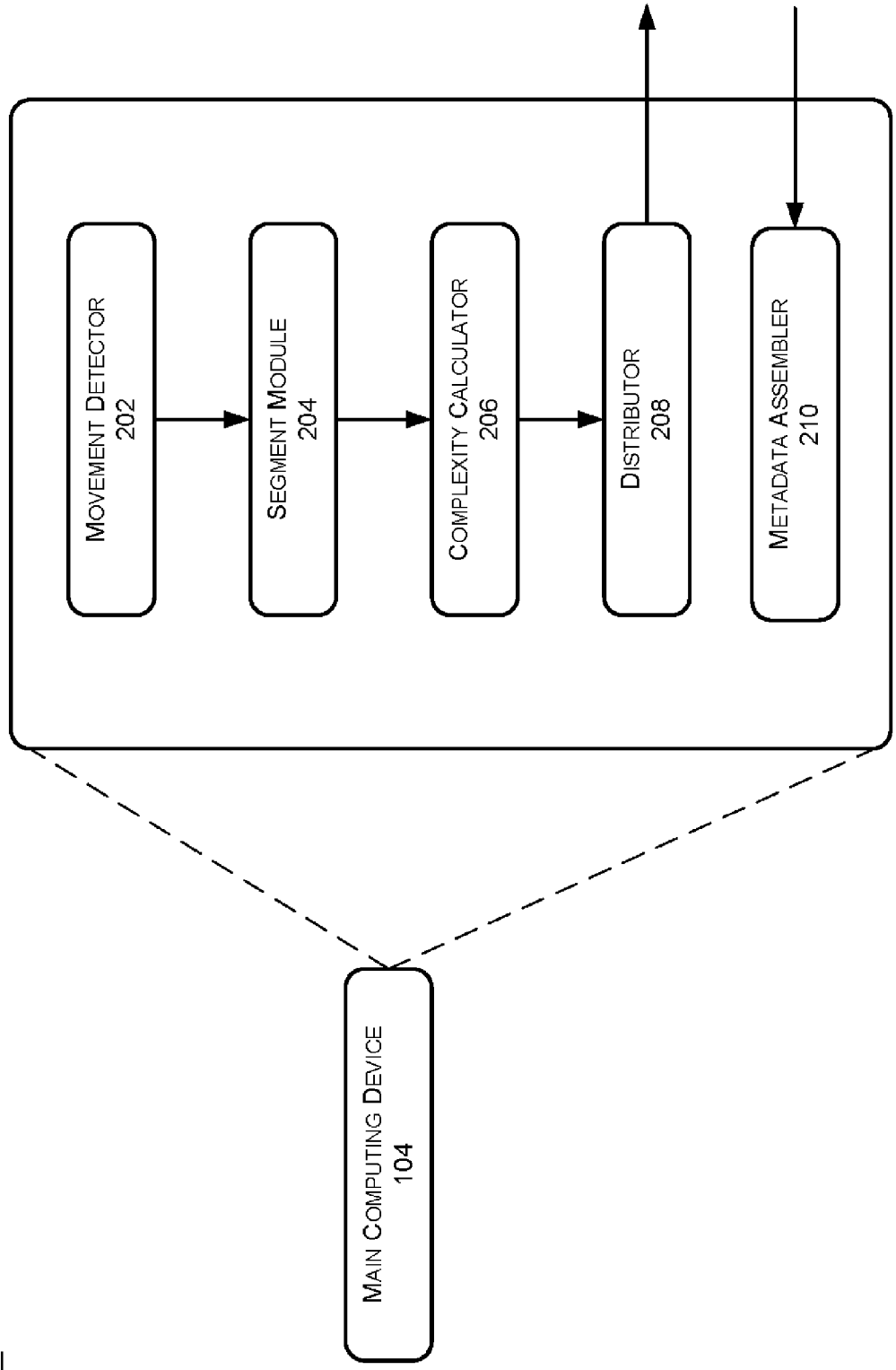
FIG. 2 shows an example configuration of a main computing device by which simultaneous metadata extraction of moving objects in a video stream may be implemented.

FIG. 2 shows an example configuration 200 of main computing device 104 by which simultaneous metadata extraction of moving objects in a video stream may be implemented, arranged in accordance with at least some embodiments described herein. As depicted, example configuration 200 may include a movement detector 202, a segment module 204, a complexity calculator 206, a distributor 208, and a metadata assembler 210.

Movement detector 202 may refer to a software module that may be executed on main computing device 104 and may be configured to detect object information of the moving objects in each one of the multiple frames of the video stream. In some examples, movement detector 202 may first extract a background image from the video stream. Such background image extraction may be based on some currently existing methods, including Gaussian Mixture Model (GMM). The background image may include multiple objects that remain still in multiple frames of the video stream. Further, movement detector 202 may be configured to compare each frame of the video stream with the background image to detect the object information of any moving objects in each frame. The object information may include at least the shape(s), the texture(s), and/or the color(s) of the moving objects and may be stored in a type of data structure such as vector(s), table(s), matrix (matrices), etc.

Segment module 204 may refer to a software module that may be configured to segment the video stream into multiple video clips based on the detected object information in each frame. With respect to one of the multiple frames, the object information of the moving objects in the frame may be referred to as $C_i$. Similarly, the object information of the immediately preceding frame may be referred to as $C_{i-1}$ and the object information of the immediately following frame may be referred to as $C_{i+1}$. Segment module 204 may be configured to select the immediately following frame as one of multiple candidate segment points, provided that the difference between $C_{i+1}$ and $C_i$ differs from the difference between $C_{i-1}$ and $C_i$ by a predetermined value, as represented by: $\|C_{i-1}-C_i\|-\|C_i-C_{i+1}\|>\phi$. The predetermined value $\phi$ may be generated in accordance with statistical data and may be modifiable.

Further, segment module 204 may be configured to select segment points from the multiple candidate segment points based on the count of frames between each two consecutive candidate segment points. A candidate segment point may be selected as a segment point if the count of the frames between a segment point (or the first frame of the video stream in selecting the first segment point) and the candidate segment is less than a predetermined number, and the count of the frames between the segment point (or the first frame in selecting the first segment point) and an immediate following candidate segment point is larger than or equal to the predetermined number. In some examples, the predetermined number may be determined in accordance with the computational capability of each of computing nodes 106 so that two or more computing nodes 106 having a same computational capability may each receive a same amount of frames to process. Segment module 204 may then be configured to segment the video stream into multiple video clips in accordance with the segment points.

Complexity calculator 206 may refer to a software module that may be configured to attach the background image to the beginning of each video clip, to gather one or more parameters that includes the number of the multiple frames of the video stream, the percentage of the object information in the video stream, and the resolution of the video stream, and, further, to calculate a computational complexity value for each video clip based on the gathered parameters.

Distributor 208 may refer to a software module that may be configured to respectively distribute each of the video clips to a corresponding one of computing nodes 106 in accordance with the computational complexity value of each video clip and the computational capability value of each computing node 106.

Metadata assembler 210 may refer to a software module that may be configured to receive metadata from computing nodes 106 and, further, to merge the metadata of a moving object that appears in two or more consecutive video clips, e.g., a preceding video clip and a following video clip. With respect to two consecutive video clips, metadata assembler 210 may be configured to generate a matrix with N rows and M columns, in which N represents the number of moving objects in the preceding video clip and M represents the number of moving object in the following video clip. Each element of the matrix may be filled with a difference value, which indicates the difference between two moving objects. The difference value may be generated based on comparing the position, the shape, the size of each moving object. Metadata assembler 210 may determine two objects, respectively in the two consecutive video clips, as a same object and merge the metadata of the two objects if the element corresponding to the two objects in the matrix has the minimum value in the corresponding row and in the corresponding column. Otherwise, metadata assembler 210 may determine the two objects as unmatched, i.e., they are different moving objects.

With respect to unmatched moving objects, metadata assembler 210 may be further configured to determine whether some moving objects are separated from, or merged into, another object at a certain point in time. Based on the position and size information of an unmatched moving object in the preceding video clip, metadata assembler 210 may be configured to estimate the position and the size information of the unmatched moving object in the following video clip. If the estimated position and size information overlaps one of the moving objects in the following video clip by a predetermined value, which may be generated by experimental data, metadata assembler 210 may determine that the unmatched object in the preceding video clip may be combined with the object in the following video clip and, further merge the metadata of the two objects. Similarly, based on the position and size information of an unmatched moving object in the following video clip, metadata assembler 210 may determine that the unmatched object are separated from a moving object in the preceding video clip. An example of which may include a person walking in the following video clip but then riding and emerging from a bus in the preceding video clip.

Thus, FIG. 2 shows an example configuration 200 of main computing device 104 that at least includes movement detector 202, segment module 204, complexity calculator 206, distributor 208, and metadata assembler 210.

Figure 3:
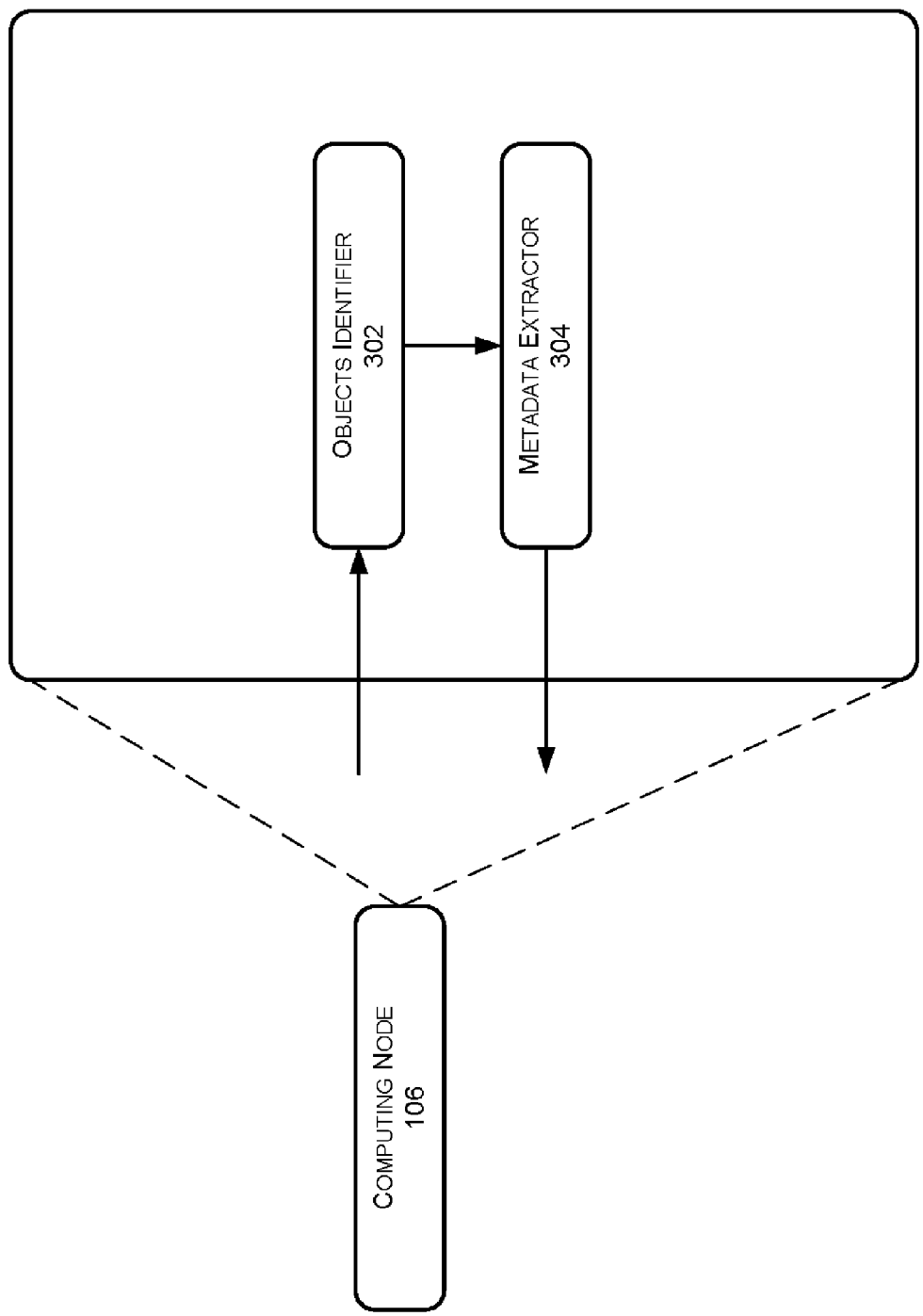
FIG. 3 shows an example configuration of a computing node by which simultaneous metadata extraction of moving objects in a video stream may be implemented.

FIG. 3 shows an example configuration 300 of computing node 106 by which simultaneous metadata extraction of moving objects may be implemented, arranged in accordance with at least some embodiments described herein. As depicted, example configuration 300 may, at least, include an object identifier 302 and a metadata extractor 304.

Objects identifier 302 may refer to a software module that may be configured to identify one or more moving objects appear in the video clip received from main computing device 104. That is, objects identifier 302 may be configured to compare each frame of the video clip with the background image attached at the beginning of the video clip to identify the moving objects. Further, objects identifier 302 may be configured to identify the moving objects that appear in the first frame and the last frame of the video clip so that metadata assembler 210 may merge the metadata thereof.

Metadata extractor 304 may refer to a software module that may be configured to extract metadata corresponding to each of the identified moving objects in the video clip. The extract metadata may include the trajectory, the color, the texture, and the shape of the moving objects. The extracted metadata may be transmitted back to main computing device 104.

Figure 4:
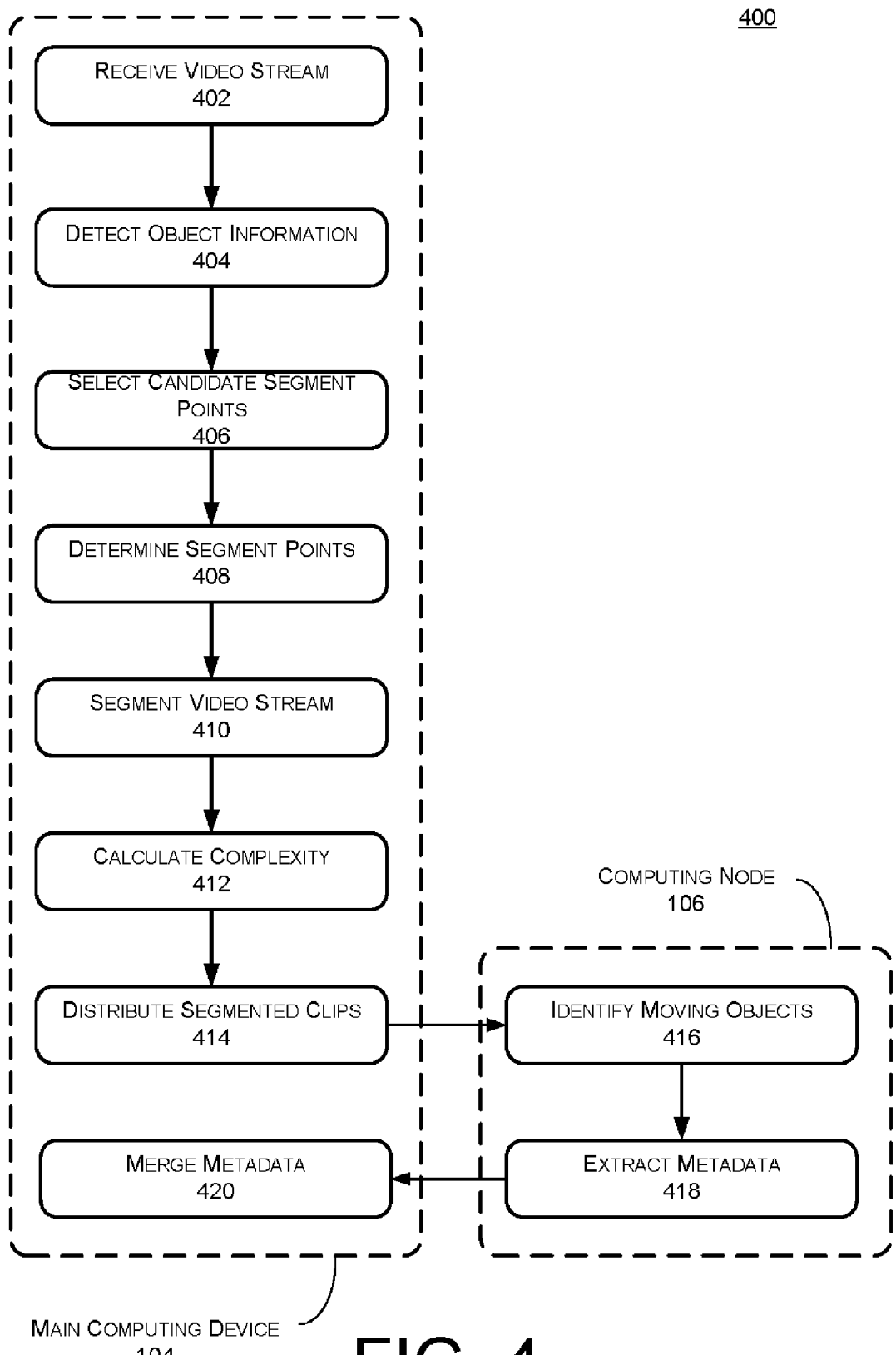
FIG. 4 shows an example configuration of a processing flow of operations by which simultaneous metadata extraction of moving objects in a video stream may be implemented.

FIG. 4 shows an example configuration of a processing flow of operations by which simultaneous metadata extraction of moving objects may be implemented, arranged in accordance with at least some embodiments described herein. As depicted, processing flow 400 may include sub-processes executed by various components that are part of example system 100. However, processing flow 400 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, 408, 410, 412, 414, 416, 418, and/or 420. Processing may begin at block 402.

Block 402 (Receive Video Stream) may refer to main computing device 104 receiving a captured video stream from video stream capture device 102. The video stream may include more than one moving objects, e.g., vehicles, pedestrians, or animals, and the object information thereof, e.g., the trajectory, the shape(s), the color(s), and/or the texture(s) of the moving objects. Processing may continue from block 402 to block 404.

Block 404 (Detect Object Information) may refer to movement detector 202 detecting the object information of the moving objects in the frames of the video stream. In some examples, movement detector 202 may extract a background image from the video stream. The background image may include multiple objects that remain still in the video stream. Further, movement detector 202 may be configured to compare each frame of the video stream with the background image to detect the object information of any moving objects in the frame. Processing may continue from block 404 to block 406.

Block 406 (Select Candidate Segment Points) may refer to segment module 204 selecting a plurality of frames from the multiple frames as candidate segment points, at which the object information changes more than a first predetermined amount relative to a frame that immediately follows each of the plurality of frames respectively. With respect to one of the multiple frames, the object information of the moving objects in the frame, referred to as $C_i$, may include the shape, the texture, and/or the color of the moving objects. Similarly, the object information of the immediately preceding frame may be referred to as $C_{i-1}$, and the object information of the immediately following frame may be referred to as $C_{i+1}$. Segment module 204 may be configured to select the immediately following frame as one of multiple candidate segment points, provided that the difference between $C_{i+1}$ and $C_i$ differs from the difference between $C_{i-1}$ and $C_i$ by a predetermined value, as represented in this inequation: $\||C_{i-1}-C_i|-|C_i-C_{i+1}|\|>\phi$. The predetermined value $\phi$ may be generated in accordance with statistical data collected from multiple repetitive experiments so that the predetermined value $\phi$ may indicate a sufficiently drastic change in the object information of the consecutive frames. The predetermined value $\phi$ may be modifiable. Processing may continue from block 406 to block 408.

Block 408 (Determine Segment Points) may refer to segment module 204 selecting segment points from the candidate segment points. Segment module 204 may select a candidate segment point as a segment point if the count of the frames between a segment point and the candidate segment point is less than a predetermined number and the count of the frames between the segment point and an immediate following candidate segment point is larger than or equal to the predetermined number. In selecting the first segment point, segment module 204 may select a candidate segment point as a segment point if the count of the frames between the first frame of the video stream and the candidate segment point is less than a predetermined number and the count of the frames between the first frame of the video stream and an immediate following candidate segment point is larger than or equal to the predetermined number. Processing may continue from block 408 to block 410.

Block 410 (Segment Video Stream) may refer to segment module 204 segmenting the video stream into multiple video clips in accordance with the selected segment points. Processing may continue from block 410 to block 412.

Block 412 (Calculate Complexity) may refer to complexity calculator 206 gathering a plurality of parameters that includes the number of the multiple frames of the video stream, the percentage of the object information in the video stream, and the resolution of the video stream and calculating a computational complexity value for each video clip based on the gathered parameters. Processing may continue from block 412 to block 414.

Block 414 (Distribute Segmented Clips) may refer to distributor 208 respectively distributing each of the video clips to a corresponding one of computing nodes 106 in accordance with the computational complexity value of each video clip and the computational capability value of each computing node 106. Processing may continue from block 414 to block 416.

Block 416 (Identify Moving Objects) may refer to objects identifier 302, as a component of computing node 106, identifying one or more moving objects appear in the video clip received from main computing device 104. That is, objects identifier 302 may be configured to compare each frame of the video clip with the background image attached at the beginning of the video clip to identify the moving objects. Further, objects identifier 302 may be configured to identify the moving objects that appear in the first frame and the last frame of the video clip so that metadata assembler 210 may merge the metadata thereof. Processing may continue from block 416 to block 418.

Block 418 (Extract Metadata) may refer to metadata extractor 304 extracting metadata corresponding to each of the identified moving objects in the video clip. The extract metadata may include the trajectory, the color, the texture, and the shape of the moving objects. Processing may continue from block 418 to block 420.

Block 420 (Merge Metadata) may refer to metadata assembler 210, as a component of main computing device 104, merging the metadata of a moving object that appears in two or more consecutive video clips, a moving object separated from another moving object, or a moving object that can be combined with another moving object.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
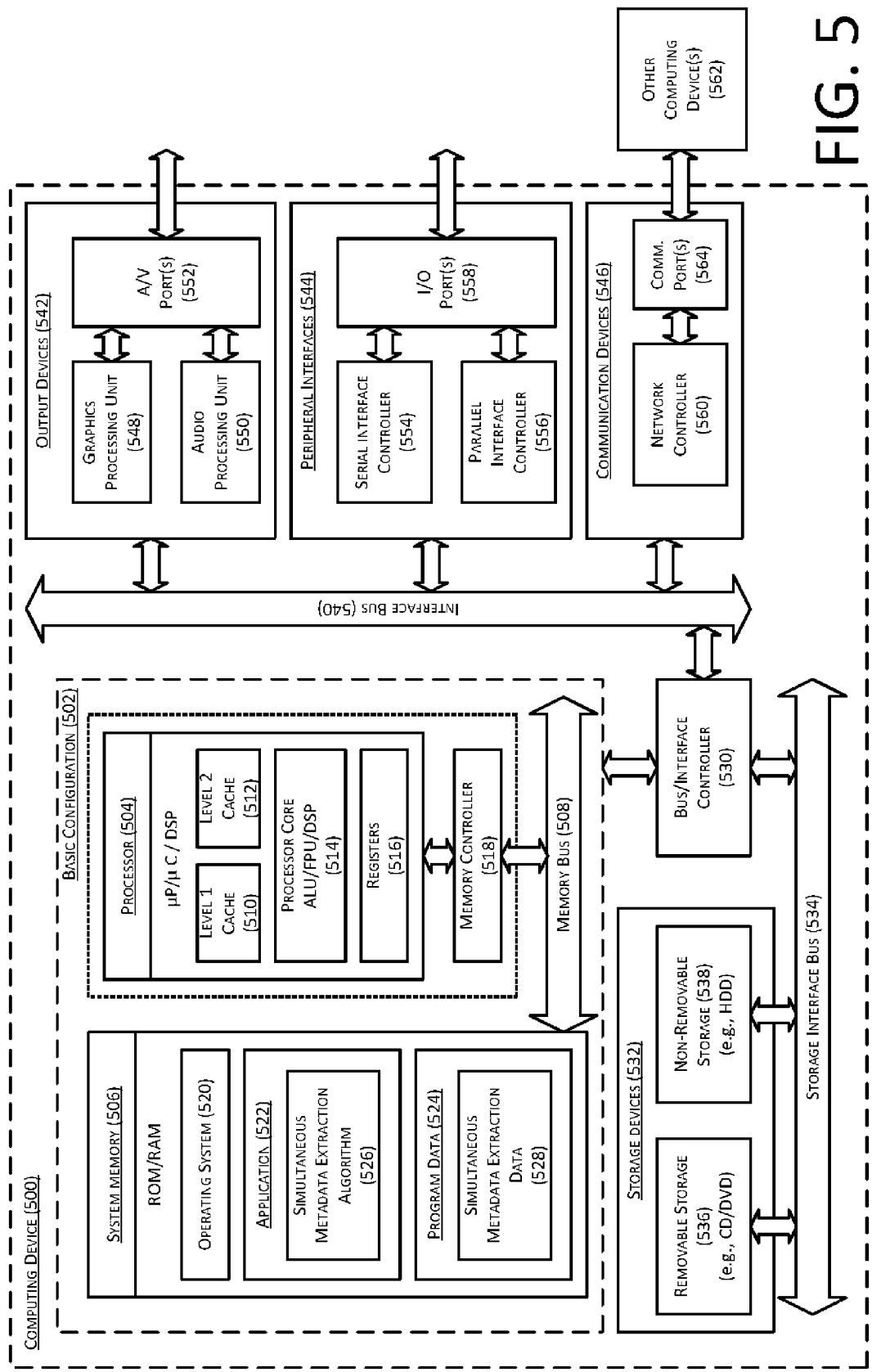
FIG. 5 shows a block diagram illustrating an example computing device that is arranged for simultaneously extracting metadata of moving objects in a video stream, all arranged in accordance with at least some embodiments described herein.

FIG. 5 shows a block diagram illustrating an example computing device that is arranged for simultaneous metadata extraction of moving objects, arranged in accordance with at least some embodiments described herein.

In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a simultaneous metadata extraction algorithm 526 that is arranged to perform the functions as described herein including those described with respect to process 400 of FIG. 4. Program data 524 may include simultaneous metadata extraction data 528 that may be useful for operation with simultaneous metadata extraction algorithm 526 as is described herein. In some embodiments, application 522 may be arranged to operate with program data 524 on operating system 520 such that implementations of simultaneous metadata extraction may be provided as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to simultaneously process multiple portions of a video stream, comprising:
    segmenting, by a computing device, the video stream that includes multiple frames into multiple video clips;
    calculating, by the computing device, a computational complexity value for each of the multiple video clips;
    receiving, by the computing device, computational capability information regarding each of multiple computing nodes;
    respectively distributing, by the computing device, the multiple video clips to the multiple computing nodes in accordance with the received computational capability information of each of the multiple computing nodes and the respective computational complexity value for each of the multiple video clips to allow for simultaneous extraction of metadata of moving objects in the video stream on the multiple computing nodes, each of the multiple computing nodes being configured to:
        identify one or more moving objects in each of the multiple video clips, and
        extract metadata corresponding to each of the one or more moving objects from each of the multiple video clips;
    receiving, by the computing device, the extracted metadata from each of the multiple computing nodes; and
    with respect to one of the multiple video clips, combining, by the computing device, the extracted metadata of one of the one or more moving objects with the extracted metadata of the one of the one or more moving objects in another one of the multiple video clips when the one of the one or more moving objects appears in the another one of the multiple video clips that immediately precedes or follows the one of the multiple video clips.

2. The method of claim 1, further comprising:
    extracting a background image from the video stream.

3. The method of claim 2, wherein the calculating a computational complexity value comprises:
    attaching the background image to the beginning of each of the multiple video clips;
    calculating a plurality of parameters that include the number of the multiple frames of the video stream, the percentage of object information in the video stream, and the resolution of the video stream; and
    calculating the computational complexity value based on the calculated plurality of parameters.

4. The method of claim 2, wherein the identifying one or more moving objects comprises comparing each of the multiple video clips with the background image.

5. The method of claim 1, wherein the segmenting the video stream comprises:
    detecting object information in at least one of the multiple frames;
    selecting a plurality of frames from the multiple frames as candidate segment points, at which the object information changes more than a first predetermined amount relative to a frame that immediately follows, respectively, each of the plurality of frames; and
    determining one or more frames from the plurality of frames as segment points that identify the beginning of each of the multiple video clips.

6. The method of claim 5, wherein the determining one or more frames as segment points comprises:
    calculating, as a first value, the number of the frames that immediately precede a first one of the candidate segment points;
    calculating, as a second value, the number of the frames that immediately precede a second one of the candidate segment points that follows the first one of the candidate segment points; and
    determining the first one of the candidate segment points as one of the segment points if the first value is larger than a predetermined value and the second value is smaller than the predetermined value.

7. The method of claim 5, wherein the object information includes one or more of the count of one or more moving objects that appear in each of the multiple frames, the positions of the one or more moving objects, and the size of the one or more moving objects.

8. The method of claim 1, wherein the metadata includes one or more of a trajectory, color(s), texture(s), and/or shape(s) of each of the one or more moving objects.

9. A system, comprising:
    a computing device configured to:
        receive a video stream that includes multiple frames,
        detect object information in at least one of the multiple frames,
        select a plurality of frames from the multiple frames as candidate segment points, at which the object information changes more than a first predetermined amount relative to a frame that immediately follows, respectively, each of the plurality of frames,
        determine one or more frames from the plurality of frames as segment points,
        segment the video stream into multiple video clips, each of which includes a subset of the multiple frames, based on the segment points that identify the beginning of each of the multiple video clips,
        calculate a computational complexity value for each of the multiple video clips,
        receive computational capability information regarding each of multiple computing nodes, and
        respectively distribute the multiple video clips to the multiple computing nodes in accordance with the received computational capability information of each of the multiple computing nodes and the respective computational complexity value for each of the multiple video clips, the distributed multiple video clips being used to simultaneously extract metadata of moving objects in the video stream, respectively, on the multiple computing nodes; and the multiple computing nodes, each configured to:
  receive one of the multiple video clips from the computing device,
  identify one or more moving objects appearing in respective ones of the multiple video clips, and
  extract metadata corresponding to each of the one or more moving objects from each of the multiple video clips,
  wherein the computing device is further configured to:
    receive, from each of the multiple computing nodes, the extracted metadata, and
    with respect to one of the multiple video clips, combine the extracted metadata of one of the one or more moving objects with the extracted metadata of the one of the one or more moving objects in another one of the multiple video clips when the one of the one or more moving objects appears in the another one of the multiple video clips that immediately precedes or follows the one of the multiple video clips.

10. The system of claim 9, wherein the metadata includes one or more of a trajectory, color(s), texture(s), and/or shape(s) of each of the one or more moving objects.

11. The system of claim 9, wherein the computing device is further configured to extract a background image from the video stream.

12. The system of claim 11, wherein the multiple computing nodes are further configured to compare each of the multiple video clips with the background image.

13. The system of claim 11, wherein the computing device is further configured to:
  attach the background image to the beginning of each of the multiple video clips;
  calculate a plurality of parameters that include the count of the multiple frames of the video stream, the percentage of the object information in the video stream, and the resolution of the video stream; and
  calculate the computational complexity value based on the calculated plurality of the parameters.

14. The system of claim 9, wherein the computing device is further configured to:
  pair each one of the multiple computing nodes with each one of the multiple video clips in accordance with the received computational capability information and the respective computational complexity value, and
  respectively distribute the multiple video clips to the paired each one of the multiple computing nodes.

15. A non-transitory computer-readable medium that stores executable-instructions that, when executed, cause one or more processors to perform operations comprising:
  receiving a video stream that includes multiple frames;
  detecting object information in at least, one of the multiple frames;
  selecting a plurality of frames from the multiple frames as candidate segment points, at which the object information changes more than a first predetermined amount relative to a frame that immediately, respectively, follows each of the plurality of frames;
  determining one or more frames from the plurality of frames as segment points;
  segmenting the video stream into multiple video clips, each of which includes a subset of the multiple frames, based on the segment points that identify the beginning of each of the multiple video clips;
  receiving computational capability information regarding each of multiple computing nodes; calculating a computational complexity value for each of the multiple video clips;
  respectively distributing the multiple video clips to the multiple computing nodes in accordance with the received computational capability information of each of the multiple computing nodes and the respective computational complexity value for each of the multiple video clips to allow for simultaneous extraction of metadata of moving objects in the video stream on the multiple computing nodes;
  receiving, from each of the multiple computing nodes, extracted metadata corresponding to each of the moving objects from each of the multiple video clips; and
  with respect to one of the multiple video clips, combining the extracted metadata of one of the moving objects with the extracted metadata of the one of the moving objects in another one of the multiple video clips when the one of the moving objects appears in the another one of the multiple video clips that immediately precedes or follows the one of the multiple video clips.

16. The computer-readable medium of claim 15, further comprising:
  extracting a background image from the video stream.

17. The computer-readable medium of claim 16, further comprising:
  attaching the background image to the beginning of each of the multiple video clips;
  calculating a plurality of parameters that include the count of the multiple frames of the video stream, the percentage of the object information in the video stream, and the resolution of the video stream; and
  calculating the computational complexity value based on the calculated plurality of the parameters.

18. The computer-readable medium of claim 15, further comprising:
  pairing each one of the multiple computing nodes with each one of the multiple video clips in accordance with the received computational capability information and the respective computational complexity value, and
  wherein the respectively distributing comprises distributing each one of the multiple video clips to the paired each one of the multiple computing nodes.

* * * * *